United States Patent
Ohnishi et al.

4,196,967
Apr. 8, 1980

[54] OPTICAL SYSTEM WITH MASKING MEANS AND METHOD FOR PRODUCING IT

[75] Inventors: Kazuo Ohnishi, Kobe; Shigeru Innami, Tondabayashi; Kaname Satou, Sakai, all of Japan

[73] Assignee: Minolta Camera Kabushiki Kaisha, Osaka, Japan

[21] Appl. No.: 959,528

[22] Filed: Nov. 13, 1978

[30] Foreign Application Priority Data

Nov. 14, 1977 [JP] Japan ................................ 52-136907

[51] Int. Cl.² .............................................. G02B 17/08
[52] U.S. Cl. ...................................... 350/178; 350/199
[58] Field of Search ............... 350/178, 199, 200, 201, 350/188

[56] References Cited

U.S. PATENT DOCUMENTS

2,748,658  6/1956  Bouwers ........................... 350/199

FOREIGN PATENT DOCUMENTS

960680 10/1956 Fed. Rep. of Germany ........... 350/199

*Primary Examiner*—Paul A. Sacher
*Attorney, Agent, or Firm*—Jackson, Jones & Price

[57] ABSTRACT

In an optical system including a transparent optical body such as a lens and a light reflecting surface disposed in the rear of the transparent optical body with a spacer of a light absorptive material being sandwiched therebetween to ensure the relative position and other optical relationship of the body and the surface. The spacer is cemented to a rear surface of the transparent body for masking the light reflecting surface and preventing light rays from entering from the front of the transparent optical body to the light reflecting surface to be reflected back by the latter. According to the present invention, the front surface of the spacer to be cemented to the rear surface of the transparent optical body is, before being cemented, polished to a degree of roughness which prevents the occurrence of fringes due to interference at a possible small gap between the transparent optical body and the spacer.

A typical example of the optical system is a reflecting type telephoto lens including a front lens in the rear of which is fixed, by a spacer, a second light reflecting surface which folds the photographic light reflected by a first reflecting surface.

10 Claims, 4 Drawing Figures

OPTICAL SYSTEM WITH MASKING MEANS AND METHOD FOR PRODUCING IT

BACKGROUND OF THE INVENTION

1. Field of the Invention

The present invention relates to a reflecting type optical system with a reflector fixed at a rear of a transparent body with a predetermined optical relationship relative to the body, for example, such as a reflecting type telephoto lens system with a second reflector fixedly disposed behind a front lens with a spacer sandwiched therebetween. The invention also relates to a method for producing such optical system, especially for fixing the reflector at the rear of the transparent body, and masking properly the transparent body side of the reflector.

2. Description of the Prior Art

Reflecting type telephoto lens are generally so constructed that light rays from an object to be photographed, at first traverses a front lens and then strike a first reflecting surface (normally concave) which reflects the light rays forwards towards a second reflecting surface which in turn direct the light rays rearwards, i.e. towards the camera body. One example of such a telephoto lens is shown in FIG. 1, wherein the reference numeral 1 denotes a front lens of a transparent optical material behind which is fixedly mounted a mirror lens 3 having formed on the left side surface (as viewed in the Figure) a light reflecting layer 3a. While the numeral 2 denotes another mirror lens having formed thereon a light reflecting layer 2a at the off axial portion of the rear, i.e. right side surface (as viewed in the Figure), and 4 and 5 denote respectively concave and convex rear lenses cemented together. With this construction, the light ray L from an object to be photographed, after traversing front lens 1, enters mirror lens 2 to be reflected by light reflecting layer 2a (first reflector) toward mirror lens 3, of which light reflecting surface 3a (second reflector) in turn directs the light ray rearwards so that the light ray traverses the central portion of mirror lens 2 where the light reflecting layer is not formed, and further passes through lenses 4 and 5 towards a film plane of a camera (not shown).

In the above optical system, the light reflecting surface 3a at the left side surface of mirror lens 3 must be disposed precisely with respect to the axial distance from the rear surface of front lens 1. The optical member 3 having the second reflector 3a must be optically centered with the front lens 1 without inclination of the reflecting surface. To this end, a spacer is interposed or sandwiched between the front lens and the optical element having the second reflector. If such a spacer is of a transparent material, such as an optical glass without light absorptive material therein, ambient lights passing through the central portion of front lens and the transparent spacer is reflected by the second reflector or reflecting layer back to the front and then reflected or refracted at the boundaries between the spacer and front lens and between the front lens and the air outside of the lens, to become stray light which will cause ghost images in the picture and increase the flare to deteriorate the quality of the lens system. Especially, the light entering the front edge portion of the spacer can cause an extremely bad effect by the edge effect with which the edge portion glistens or glints.

As countermeasures to eliminate such extra and unnecessary reflected light, the following measures of masking have been known:

(1) The spacer is painted or coated with black paint at its front surface, i.e. the surface facing the front lens, and then cemented to the front lens.
(2) The spacer is coated with an opaque layer, such as of chromium oxide or gold, by vacuum deposition or evaporation over its front surface and then cemented to the front lens.
(3) The spacer is cemented to the front lens with bond having mixed therein a light absorptive material.
(4) The space is made of an opaque material such as black glass.

Of the above countermeasures, the measures (1) and (2) have a disadvantage that the bonding strength between the spacer and the front lens is low or insufficient because the bonding strength between the surface of the spacer and the layer painted or coated by the vacuum deposition or evaporation is not very high. Moreover, if the material to be coated is a light reflective material such as gold in the case of (2), the light reflected by the layer will cause ghost images and flares. In the case of (3), the light absoptive material mixed in the bond reduces the bonding strength of the bond in proportion to the amount of the light absorptive material. If the amount of the material is reduced, then the bonding strength of the bond will be raised but the masking effect will be lowered.

The measure of (4) also has a disadvantage as follows. The front surface of the spacer is generally required to have the negative shape of the rear surface of the front lens, i.e. the curvature having the offset relationship with the curvature of the same, (if the rear surface of the front lens has a curvature of $r_o$, the curvature of the front surface of the space is required to be $-r_o$), in order that the position of the second reflecting surface relative to the other optical elements may be ensured with respect to its axial distance and of optical axes i.e. centering. To this end, the front surface of the spacer has been polished as smooth as the lens and centered and edged. However, since the spacer was usually made of glass or the like, interference of light occurred where there was a slight noncoincidence in the shape or curvature between the surfaces of the front lens and the spacer or a slight mismatching to form a wedged air film between the surfaces, so that interference patterns were observed in some of the telephoto lenses from their front. Such intereference pattern or fringes will be of concentric rings i.e. fringes of equal thickness as shown in FIG. 2(a) when the radii of the curvatures of the surfaces are slightly different from each other, while stripes of parallel dark lines i.e. fringes of equal inclination as shown in FIG. 2(b) will appear where the wedged space is formed between the surfaces. When there is a disorder in the front surface of the spacer, an irregular pattern of fringes will be observed such as FIG. 2(c). These interference patterns or fringes will be more conspicuous when the optical system with such a spacer and front lens is incorporated or assembled in a lens barrel mechanism, because the spacer and the lens are surrounded by the dark walls of the barrel mechanism. Thus the inference patterns devaluate the lens systems with respect to their commercial quality. If the lenses bearing such interference patterns or fringes are not to be put on market, then the percentage of produced products with the desired quality will decrease extremely. Furthermore, in an optical system including a transparent body to which an opaque body is attached with a polished surface of the latter being in close contact with the former, it is likely that scratches on the smoothly polished surface are more noticeable and will spoil the appearance of the lens or lens systems. There have been also known optical systems wherein a spacer of the light absorptive material is bonded to a transparent front lens with the spacer being coated and masked in accordance with one of the above mentioned measures (1) through (3). However, such optical systems still have the disadvantages inherent in these measures.

The present invention is substantially based on the measure (4) but is contemplated to provide an improved masking for the above mentioned type optical system.

SUMMARY OF THE INVENTION

It is accordingly the primary object of the present invention to provide an improved optical system including a transparent body, a light reflecting surface and a spacer made of light absorptive material and sandwiched therebetween.

It is another object of the present invention to provide such an optical system as mentioned above, free from the disadvantages inherent to the optical systems having the conventional masking means.

It is still another object of the present invention to provide an optical system with a masking means that is free from the appearance of interference fringes and from visibility of scratches.

It is a further object of the present invention to provide a method or process for coupling the transparent body, spacer and the light reflecting surface for the above mentioned optical system in a manner that is simple in process and that enables obtainment of a high percentage of desired quality products.

It is still further object of the present invention to provide an improved reflecting type telephoto lens with a favorable appearance for the front lens portion and an improved method for producing the lens.

According to the present invention, in an optical system including a transparent optical body such as a lens and a light reflecting surface disposed in the rear of the transparent optical body with a spacer of a light absorptive material being sandwiched therebetween to ensure the relative position and other optical relationship of the body and the surface, the spacer being cemented to a rear surface of the transparent body for masking the light reflecting surface and preventing light rays from entering from the front of the transparent optical body to the light reflecting surface to be reflected back by the latter. The front surface of the spacer to be cemented to the rear surface of the transparent optical body (bonding surface) is, before being cemented, polished to a degree of roughness which prevents occurrence of fringes due to interference at a possible small gap between the transparent optical body and the spacer.

DETAILED DESCRIPTION OF THE PREFERRED EMBODIMENT

Figure 1:
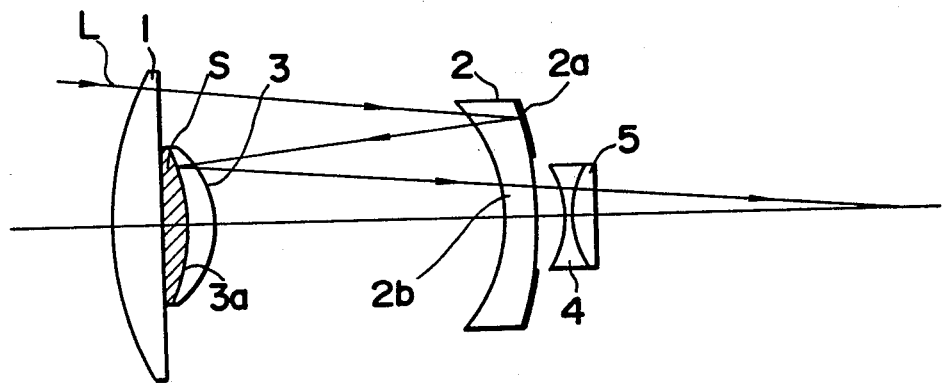
FIG. 1 is a schematic view of a telephoto lens to which the present invention may be applied.

An embodiment of the present invention will now be explained with reference to FIG. 1 which shows a general configuration of a telephoto lens system to which the present invention may also be applied. Front lens 1 and mirror lens 3 having the second light reflecting surface 3b are, in advance, given well known ordinary treatments such as polishing, centering and edging, and coating with single or multiple light transmissive layer or layers of light reflecting material.

Spacer S is polished at its front surface to be cemented to the back surface of front lens 1 (bonding or cementing surface), with polishing powder such as carborundum or the like having a grain size of about 1300 mesh, thereby obtaining a surface of a desired roughness and a desired thickness of the spacer, which is then centered and edged. It is noted that the opposite surface of the spacer may be polished in the same way. The grain size of the polishing powder desirably ranges between 300 and 2000 in mesh. If the size is larger than 300, the surface of the spacer polished with the polishing powder of the size will assume a light scattering property and appear to be whitish. If the size is smaller than 2000 mesh, the surface will be so smooth as to permit the occurrence of the interference fringes and make visible the scratches which have been formed while the surface of the spacer was polished. In optical systems employing the spacer having the bonding or cementing surface polished at the final stage with polishing powder of a grain size within the above range, the light striking the bonding surface of the spacer is scattered to such a degree that the light reflected at the bonding surface does not travel to the film plane of the camera but that the interference patterns or fringes and the scratches are eliminated or vanished by the scattering. It is to be noted that the polishing process of the bonding surface may include a plurality of stages or steps in which the surface is polished with the grain size of polishing powder used being changed, normally large to small as the stage or step goes on. In this case, the polishing powder of a size within the above range should be used at the final stage or step.

Figure 2A:
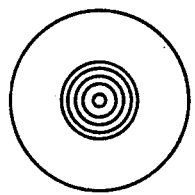
FIGS. 2a, 2b and 2c are diagrammatic illustrations of interference fringes observed in conventional optical systems.
Figure 2B:
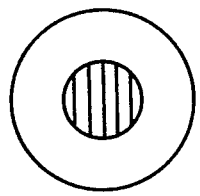
Figure 2C:
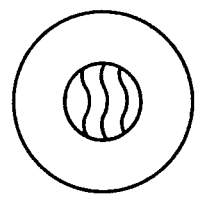

It will be apparent to those skilled in the art that the optical system to which the present invention is applied, is not limited to the structure as shown in FIG. 2, but that various types of optical systems are available. For example, as a modification from the construction shown in FIG. 1, the central portion 2a of mirror lens 2 may be apertured through or the second reflecting surface 3a may be formed on the right side surface (as viewed in the Figure) of mirror lens 3 or directly on the right side surface of spacer S. It should further be noted that the present invention is applicable to any kind of optical system which includes a reflecting surface disposed or arranged a given distance spaced from a transparent body with a spacer of light absorptive nature being interposed or sandwiched therebetween and in which the boundary or bonded portion between the transparent body and the spacer is externally visible so that interference at the boundary should be avoided. The radius of curvature of the surface of the transparent body is not necessarily of finite value but may be infinite. In other words, the surface may be plane. Further, the spacer may not necessarily be totally light absorptive but may be colored so long as it is absorptive to some degree.

What is claimed is:

1. In an optical system including a transparent optical body having a rear surface externally visible through the transparent body, a light reflecting surface, and a spacer of a light absorptive glassy material, said spacer being sandwiched between said transparent body and said reflecting surface to ensure the optical relationship between the two, the improvement wherein said spacer is bonded to said transparent body with the surface of the spacer to be bonded having the negative shape of said rear surface and a roughness which is enough to prevent occurence of fringes due to interference at any possible gap between the transparent body and the spacer but which is not enough to make the surface whitish.

2. The optical system as claimed in claim 1 wherein said surface of the spacer to be bonded to said transparent body has a roughness polished with polishing powder between 300 and 2000 in mesh.

3. The optical system as claimed in claim 2 wherein said optical system is a reflecting type telephoto lens comprising a front lens as said transparent optical body, a first reflector for reflecting a light traversing said front lens back to the front, and a second reflector including said light reflecting surface and for reflecting the light from said first reflector to the rear of the system, said second reflector being fixed on said spacer.

4. The optical system as claimed in claim 3 wherein said second reflector includes a lens having formed a light reflecting layer at one surface thereof which is cemented to the spacer.

5. The optical system as claimed in claim 3 wherein said light reflecting surface is formed on said spacer.

6. In a process of producing an optical system including a transparent optical body having a rear surface externally visible through the transparent body, a light reflecting surface, and a spacer of a light absorptive glassy material, said spacer being sandwiched between said transparent body and said reflecting surface to ensure the optical relationship between the two, the improvement comprising the steps of forming one surface of said spacer into the negative shape of said rear surface of said transparent body, polishing the surface of said spacer to a roughness which is enough to prevent occurrence of fringes due to interference at any gap formed between said transparent body and said spacer when they are bonded together, but which is not enough to make the surface of whitish appearance due to scattering, and cementing the surface of said spacer to said rear surface of said transparent body.

7. The process as claimed in claim 6 wherein the surface of said spacer is polished with polishing powder of a size between 300 and 2000 in mesh, at the final stage of polishing process.

8. The process as claimed in claim 7 wherein the size of the polishing powder is about 1300 in mesh.

9. In a multi-element lens system having an internal folded optical path including a front optical lens and at least a pair of reflective surface elements, the improvement comprising;
a supporting element for providing a first reflective surface attached to the image side of the front optical lens and visible through the front optical lens from the exterior of the lens system, the interfacing surface between the front optical lens and the supporting element being abraded to eliminate any visible fringe interference patterns from ambient light striking any gap between the supporting element and the front lens element.

10. The invention of claim 9 wherein the interfacing surface is abraded to a predetermined roughness with an abrasive powder between 300 and 2000 in mesh.

* * * * *